March 10, 1925.
W. L. R. EMMET
1,529,350
SHAFT PACKING
Filed Dec. 26, 1922
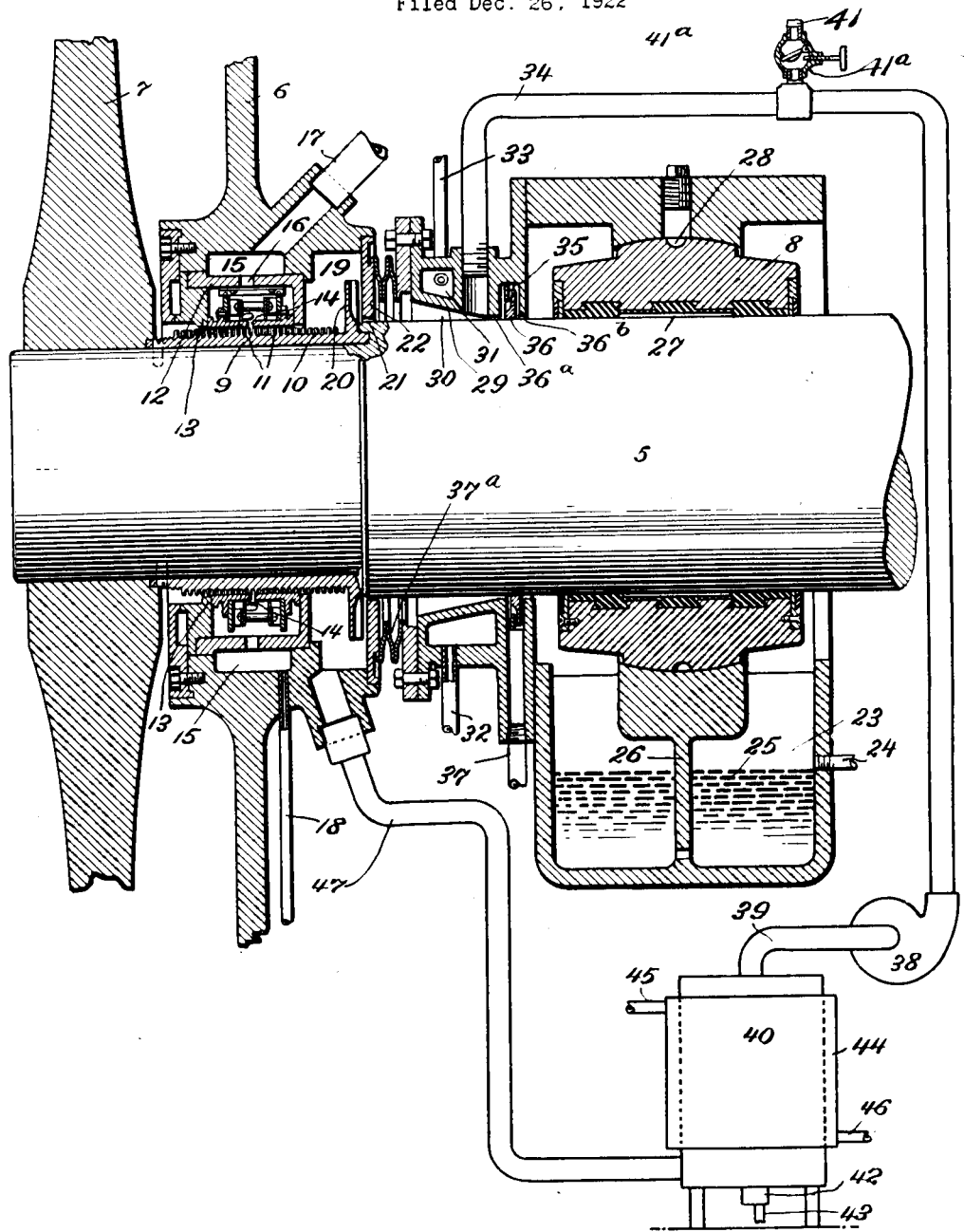
Inventor:
William L. R. Emmet,
by Alexander f. Lint
His Attorney;

Patented Mar. 10, 1925.

1,529,350

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

SHAFT PACKING.

Application filed December 26, 1922. Serial No. 609,163.

*To all whom it may concern:*

Be it known that I, WILLIAM L. R. EMMET, a citizen of the United States, residing at Schenectady, in the county of Schenectady, State of New York, have invented certain new and useful Improvements in Shaft Packing, of which the following is a specification.

The present invention relates to shaft packings used to prevent leakage between a rotating shaft and a surrounding casing wall through which the shaft projects and has for its object to provide an improved packing which is well adapted for use with a mercury turbine system such as that disclosed in my Patent No. 1,167,158 patented Jan. 4, 1916, although it is not necessarily limited thereto.

A packing for a mercury turbine presents problems not met with in steam turbines in that it is very important that no mercury vapors escape to atmosphere and that no mercury be lost; also that air be prevented from coming in contact with the mercury and forming oxides therewith, and more particularly the object of my invention is to provide a packing which meets the requirements of a mercury turbine in a wholly satisfactory manner.

For a consideration of what I believe to be novel and my invention, attention is directed to the accompanying description and the claims appended thereto.

In the drawing, the figure is a sectional view of a packing embodying my invention, certain parts associated therewith being shown diagrammatically.

Referring to the drawing, 5 indicates a turbine shaft which projects through a casing wall 6 and carries a turbine wheel 7 on its inner end. The outer end of shaft 5 is supported in a bearing 8, and between bearing 8 and casing wall 6 is arranged the shaft packing. The packing comprises a sleeve 9 fixed on shaft 5 and provided with radially projecting annular packing teeth 10 which pack against adjacent surfaces on rings 11 which surround sleeve 9. Rings 11 are stationary and are carried in a housing 12 formed in the opening in casing wall 6 through which the shaft projects. Rings 11 are maintained in axial spaced relation to each other by a holder 13 so as to provide an annular sealing passage 14 at about the center of the packing. Surrounding housing 12 is an annular chamber 15 which communicates with housing 12 through a number of spaced openings 16. Connected to chamber 15 is a conduit 17 for supplying sealing vapor under suitable pressure to the packing and a conduit 18 for draining condensate from chamber 15. Adjacent housing 12 are walls forming an annular chamber 19 in which is an impeller 20 carried by shaft 5. The inlet to the impeller is through a small annular clearance space 21 between shaft 5 and the end wall 22 of chamber 19.

Bearing 8 may be of any suitable structure and supported in any suitable manner and below it is a well 23 which receives the lubricant leaking from the bearing. Leading from well 23 is a discharge pipe 24 located a sufficient distance above the bottom of the well to maintain a quantity of lubricant in the well as indicated at 25. This lubricant cooperates with a wall 26 to form a liquid seal for the left hand side of the bearing. Lubricant is supplied to the bearing in the usual manner by a suitable pump or other pressure means, it being supplied to annular space 27 between the shaft and the bearing and to annular pocket 28 from which it flows axially in both directions.

Between the end wall 22 of annular chamber 19 and the bearing is a surrounding wall 29 which forms an annular chamber 30 around shaft 5. Surrounding wall 29 are walls forming an annular passage 31 for a cooling medium, such as water, 32 being a pipe for conveying cooling medium to passage 31 and 33 being a pipe for conveying it away. Connected to annular chamber 30 is a conduit 34 and between this conduit connection and the end of the bearing are walls forming an annular groove 35 which opens toward shaft 5. On shaft 5 is an impeller 36 which runs in groove 35. The edges of groove 35 have close clearance with shaft 5 providing annular spaces 36ª and 36ᵇ around the shaft through which vapors may be drawn to impeller 36. Leading from groove 35 is a discharge pipe 37.

The space between the end wall of chamber 19 and the wall of cooling passage 31 is closed by an axially yieldable diaphragm member 37ª suitably welded in position.

Conduit 34 is connected to the discharge side of a centrifugal pump 38. The suction side of pump 38 is connected by a conduit 39 to the discharge opening of a cooler and separator 40. The inlet to the cooler and separator 40 is connected by conduit 47 to chamber 19. Connected to conduit 34 is a pipe 41 for supplying a gas to conduit 34, the pipe being provided with a suitable throttling and non-return valve 41ª which permits flow of gas from pipe 41 to conduit 34 but prevents flow in the opposite direction. The cooler and separator may be of any suitable structure, its function being to take a mixture of condensible and non-condensible vapor and gas, cool and condense the condensible vapor, and separate the condensate from the non-condensible gas. The non-condensible gas is discharged through conduit 39 while the condensate is collected in a well 42 at the bottom of the cooler and separator and drained away by a pipe 43. At 44 is indicated a cooling jacket having a cooling medium inlet pipe 45 and a discharge pipe 46. Any suitable form of cooler and separator may be used but I preferably employ one such as that disclosed in my co-pending application, Serial No. 609,162 filed on even date herewith.

In the present instance the packing illustrated is a low pressure packing which functions to prevent leakage of air into the wheel casing, a vacuum being maintained in the casing in any suitable manner. Mercury vapor of suitable pressure for sealing the packing is supplied through conduit 17 filling annular chamber 15 and flowing therefrom to housing 12 through openings 16. From housing 12 the vapor flows through annular passage 14 to the packing proper where it divides, part flowing toward the left into casing 6 and part flowing toward the right into chamber 19. This flow of sealing vapor prevents any leakage either to or from the turbine casing. The sealing vapor which flows to the turbine wheel casing passes to the usual condenser where it is condensed and saved. Centrifugal pump 38 is operated to effect a circulation of the vapor which escapes to chamber 19 through conduit 47 to cooler and condenser 40. Here the mercury vapor is condensed and collected in well 42 from which it is drawn off by pipe 43 while the non-condensible gas is pumped through conduit 34 to chamber 30. The non-condensible gas flows from chamber 30 through annular clearance space 21 to chamber 19, this flow being assisted and maintained by impeller 20. This insures that all the vapor escaping from the packing proper to chamber 19 finds its way to conduit 47 and that none escapes through space 21 toward the bearing. Conduit 47, cooler and separator 40 and conduits 39 and 34 form a closed circulating system and in this I employ a gas which is chemically inert toward mercury. A suitable gas is ordinary illuminating gas and conduit 41 may be connected to a supply of such gas. The pressure of this supply through valve 41 is maintained slightly higher than the atmosphere so such system is kept filled. The chamber at the left hand side of the bearing is sealed from the atmosphere by wall 26 and lubricant 25 and air is prevented leaking through the bearing to such chamber by the oil pressure maintained in spaces 27 and pocket 28. Impeller 36 acts to draw vapors and gas through clearance spaces 36ª and 36ᵇ and discharge them through pipe 37 which may lead to any suitable point. This discharge will comprise primarily gas from chamber 30 and some oil vapor. Cooling medium, for example water, is circulated through passage 31 to cool the incoming gas. Drain pipe 18 may lead to any suitable region of lower pressure, for example, to the condenser for the turbine and serves to drain away any condensate which collects in the bottom of chamber 15.

Diaphragm member 37ª serves to permit relative axial expansion of the adjacent parts, thereby preventing distortion which might impair the clearances and cause rubbing.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. The combination with a shaft and a wall through which the shaft projects, of a packing for preventing leakage along the shaft, said packing comprising adjacent parts on the wall and shaft which have a close clearance, means for supplying sealing fluid to the clearance space between said parts, a chamber which receives sealing fluid leaking to the outer side of said parts, and means for circulating a gas through said chamber to prevent the entrance of air into it and to carry off the leakage fluid, whereby contamination of the sealing fluid with air is prevented.

2. The combination with a shaft and a wall through which the shaft projects, of a packing for preventing leakage along the shaft, said packing comprising adjacent parts on the wall and shaft which have a close clearance, means for supplying sealing fluid to the clearance space between said parts, a chamber which receives sealing fluid leaking to the outer side of said parts, a closed circulating system connected to said chamber, means for circulating a gas through it, and a separator in said circulating system for separating sealing fluid from said gas.

3. A packing for a mercury turbine, said packing comprising adjacent parts having a close clearance, means for supplying mercury vapor to the clearance space between said parts to seal the packing, a chamber adjacent the outer end of said parts which receives mercury vapor from said parts, a closed circulating system connected to said chamber, means for circulating a gas through said system to carry mercury vapor from the chamber, and a cooler and separator in said system for condensing the mercury vapor and separating it from the gas.

4. The combination with a casing, a shaft, and a bearing for the shaft, of a packing located between the bearing and casing, said packing comprising adjacent parts having a close clearance, means for supplying a sealing vapor to the clearance space between said parts, a chamber which receives vapor leaking from said packing, walls between said chamber and the bearing which form a second chamber adjacent to the first-named chamber, a closed circulating system connected to said chambers for circulating a gas from the second-named chamber to the first, a cooler and separator in said system, and means forming a liquid seal for preventing leakage of air past the bearing to said second chamber.

In witness whereof, I have hereunto set my hand this 22nd day of December, 1922.

WILLIAM L. R. EMMET.